United States Patent [19]
Blackwell

[11] Patent Number: 5,184,922
[45] Date of Patent: Feb. 9, 1993

[54] ROOF BOLT ANCHOR

[76] Inventor: Russell Blackwell, 2109 Arcadia Rd., Birmingham, Ala. 35214

[21] Appl. No.: 807,716

[22] Filed: Dec. 16, 1991

[51] Int. Cl.⁵ ............................................ E21D 21/00
[52] U.S. Cl. .................. 405/259.1; 411/33; 411/75
[58] Field of Search ............... 405/259.1, 259.3, 259.4, 405/259.5, 259.6; 411/15, 32, 33, 47, 63, 67, 75

[56] References Cited

U.S. PATENT DOCUMENTS

| | | | |
|---|---|---|---|
| 2,950,602 | 8/1960 | Lang | 405/259.3 X |
| 4,147,458 | 4/1979 | Elders | 405/259.1 |
| 4,295,760 | 10/1981 | Warner | 405/259.1 |
| 4,626,139 | 12/1986 | Blackwell | 405/259.1 |

*Primary Examiner*—David H. Corbin
*Attorney, Agent, or Firm*—Jennings, Carter, Thompson & Veal

[57] ABSTRACT

An anchor for securing a mine roof bolt within a hole preformed within a rock strata. The anchor comprises a plurality of transversely bent plastic leaves, each having an aperture through which the roof bolt is received, a support nut threadably connected to the bolt for supporting the plastic leaves, a stirrup supported on the support nut and on which the leaves are rested and a compression nut threadably connected to the roof bolt above the leaves for compressing the leaves against the stirrup responsive to the rotation of the roof bolt in a selected direction. As the transversely bent leaves are compressed the edges thereof are urged against the strata to grip the same and thereby secure the roof bolt within the hole. The stirrup and the compression nut are shaped to maintain the leaves at a selected inclinations during compression.

20 Claims, 5 Drawing Sheets

ROOF BOLT ANCHOR

FIELD OF THE INVENTION

The present invention relates to mine roof bolts and more particularly to anchors connected to such bolts for securing the mine roof bolt within a preformed hole. In greater particularity the present invention relates to roof bolt anchors having a plurality of leaves and means for urging such leaves in gripping engagement with the defining face of the hole.

BACKGROUND OF THE INVENTION

Mine roof bolts and anchors for securing such bolts within a preformed hole are common in the industry. The roof bolts are used to support the ceiling of a mine by compressing the ceiling upward into a self-supporting beam. Holes are predrilled within the ceiling and the bolts are inserted within the holes and in abutment with the ceiling. An anchor attached to the inserted end of the bolt secures the bolt within the hole while the bolt is tightened against the ceiling. The bolt may support beams or ceiling plates against the ceiling to distribute the compressive force over a larger area of ceiling surface. The bolt is able to support the ceiling only if the anchor remains secure within the hole. If the anchor slips, the bolt slips and compression is removed from the ceiling of the mine. Without the supporting compressive force of the bolt, the ceiling will eventually collapse. Therefore many attempts have been made to devise anchors which are impervious to slippage. Representative of such anchors which are in some manner similar in appearance to the present invention are those shown in U.S. Pat. Nos. 4,626,139; 4,147,458; 4,100,748; 2,950,602; 1,352,201 and 1,367,080 although some of these are not suitable for use as mine roof bolt anchors.

The '080 patent shows a bolt anchor which utilizes a set of flat hard metal washers which are stacked on a bolt in alternating sequence with a plurality of transversely bent washers of soft or deformable material. The washers are compressed to distend the bent washers into engagement with the bore hole walls. This compression is achieved by either inserting the bolt head into the bore hole in a non-rotable manner and compressing the washers by means of a nut threaded onto the bolt, thereby leaving a portion of the bolt protruding from the hole; by impaction of the washers into the hole and then threadably engaging the washers onto the bolt; or by placing a nut in the bottom of the hole in a non-rotating manner, filling the hole with washers and inserting a bolt to compress the washers. Each instance appears to require a bore hole full of washers and does not allow further travel of the bolt; furthermore, it appears that the bent washers on the ends of the alternating series would flatten first, thereby requiring motion of the flattened washer to enable flattening of the other washer. It is readily apparent that motion of a seated washer in an expansion anchor has deleterious effects.

The '201 patent shows an expansion anchor using a plurality of curved deformable washers mounted in facing pairs with the curvature of the adjacent washers being in opposition. These washers are compressed by means such as described with regard to the '080 patent. Again, it should be noted that the end washers are apparently going to engage the bore hole walls first and must slide along the hole in order to flatten the remaining washers.

The '602 patent shows an expansion anchor which uses split rings circumscribing the roof bolt. The split rings are of two different diameters and are designed to be compressed with one size within the other to engage both the bore hole and the roof bolt. A plurality of such anchor rings may be used with each set of anchor rings separated by a metal tube which transmits forces between the upper and lower rings. This device relies on an upper nut which must non-rotably engage the bore hole through the use of outward projections and a lower nut or strap which must advance with the bolt to compress the split rings vertically and thereby cause their lateral expansion. When the rings are fully seated the bolt cannot be advanced further due to the lower stop engaging the rings.

The '748 patent shows an expansion anchor which uses a wedge and bail support sleeve which move responsive to the rotation of a bolt such that the sleeve is compressed between the downwardly traveling wedge and the wall of the bore hole. The primary gripping force in this type anchor has been found to exist only in the region of the sleeve that is first expanded into engagement with the wall of the bore hole.

The '458 patent shows a roof pin anchor which utilizes a pair of resilient curved locking disc which are spaced apart by intermediate reinforcing spaces therebetween. The assemblage is forced upwardly into the bore hole. The discs are not compressed and engage the walls of the bore hole solely due to weight pulling downward on the bolt. The spacers provide a locus for the pivoting motion of the periphery of the subjacent and superjacent discs. More than one spacer element may separate the discs.

Despite the achievements and efforts involved is developing the abovementioned anchors, the problem of slippage remained. A significant improvement to mine roof bolts was made, however, with the invention set forth in '139 which utilizes a plurality of transversely bent elongated leaves which are compressed within a bail by the rotation of the roof bolt. The compression results in movement of the leaves toward a flattened position whereby the outer edges of the leaves engage the bore hole walls to anchor the bolt. Spacers are provided which evenly distribute the compressive forces among the leaves such that the leaves engage the bore wall simultaneously and with the same pressure. The bail is supported by an upper end of the mine roof bolt and depends therefrom on either side of the bolt. A nut threadably connected to the bolt is selectively urged downward against the leaves responsive to the rotation of the bolt to compress the leaves against the supporting bail and urge the outer edges of the leaves against the defining wall of the hole. As is shown herein, the present invention includes components similar in general description to selected components described in '139 and also includes additional components and improvements to those components set forth in '139 that, in combination, form a novel roof bolt anchor that will engage the defining face of a preformed hole and secure a mine roof bolt in non-slipping relation therein.

SUMMARY OF THE INVENTION

It is the object of the present invention to provide an improved roof bolt anchor for qripping the internal face of a predrilled hole to secure a roof bolt therein.

Another object of the present invention is to provide an improved roof bolt anchor that will permeate the face of the preformed hole when urged thereagainst.

In support of the previous object, another object of the present invention is to provide an improved roof bolt anchor that maintains the gripping members in optimal angular relation to the defining face to maximize the gripping members ability to support the mine roof bolt within the hole.

Yet another object of the present invention is to maximize the strength of the roof bolt anchor while minimizing the complexity and manufacturing cost of its component parts.

These and other objects and advantages of the present invention are accomplished through the use of a stacked plurality of elongated leaves each having a central aperture therethrough and curved edges on opposite ends thereof. The leaves are bent transversely proximal to the aperture and receive a roof bolt therethrough. A support nut is threadably connected to the bolt below the leaves and supports a stirrup. The stirrup includes a base having an orifice therethrough in which the bolt is received. The base defines an upper surface, having a ridge formed thereon, that slopes from the orifice to define a pair of marginal edges. The stacked plurality of leaves is supported on the upper surface and secured in parallel relation thereon by two vertical members connected to the base on opposing sides thereof that project upwardly therefrom on either side of the stacked plurality of leaves. The leaves and vertical members are designed to fit snugly within a preformed hole and are made of a hardened plastic. A compression leaf is supported atop the stack of plastic leaves and is formed of hardened metal. A compression nut is threadably connected to the bolt above the compression leaf and is secured by the vertical members in non-rotating relation to the stacked plurality of leaves. The compression nut moves downwardly, responsive to the rotation of the roof bolt, and compresses the stacked plurality of plastic leaves against the upper surface of the base. The compression nut includes two lateral flanges which contact the compression leaf proximal the ends thereof to maintain downward pressure on the extended ends of the plastic flanges. The compression of the plastic leaves by the compression nut will urge the curved edges outward and against the defining face of the hole, but the lateral flanges of the compression nut and the ridge formed by the base will maintain the transversely bent leaves at a selected inclination to prevent the leaves from folding upwardly as a result of excessive downward forces exerted on the roof bolt. Predetermined compressive forces will bend the lateral flanges outwardly and against the defining face of hole to pierce the rock strata in which the hole is drilled. Thus, the flanges help secure the anchor while maintaining the optimal inclination of the stacked plurality of leaves. As previously stated, the leaves are plastic and, when urged against the defining face of the hole, either cut into the defining rock strata or permeate the strata to grip the strata and thus secure the bolt within the hole.

BRIEF DESCRIPTION OF THE DRAWINGS

Apparatus embodying features of my invention are depicted in the attached drawings, which forms a portion of this application, wherein.

DESCRIPTION OF A PREFERRED EMBODIMENT

Figure 1:
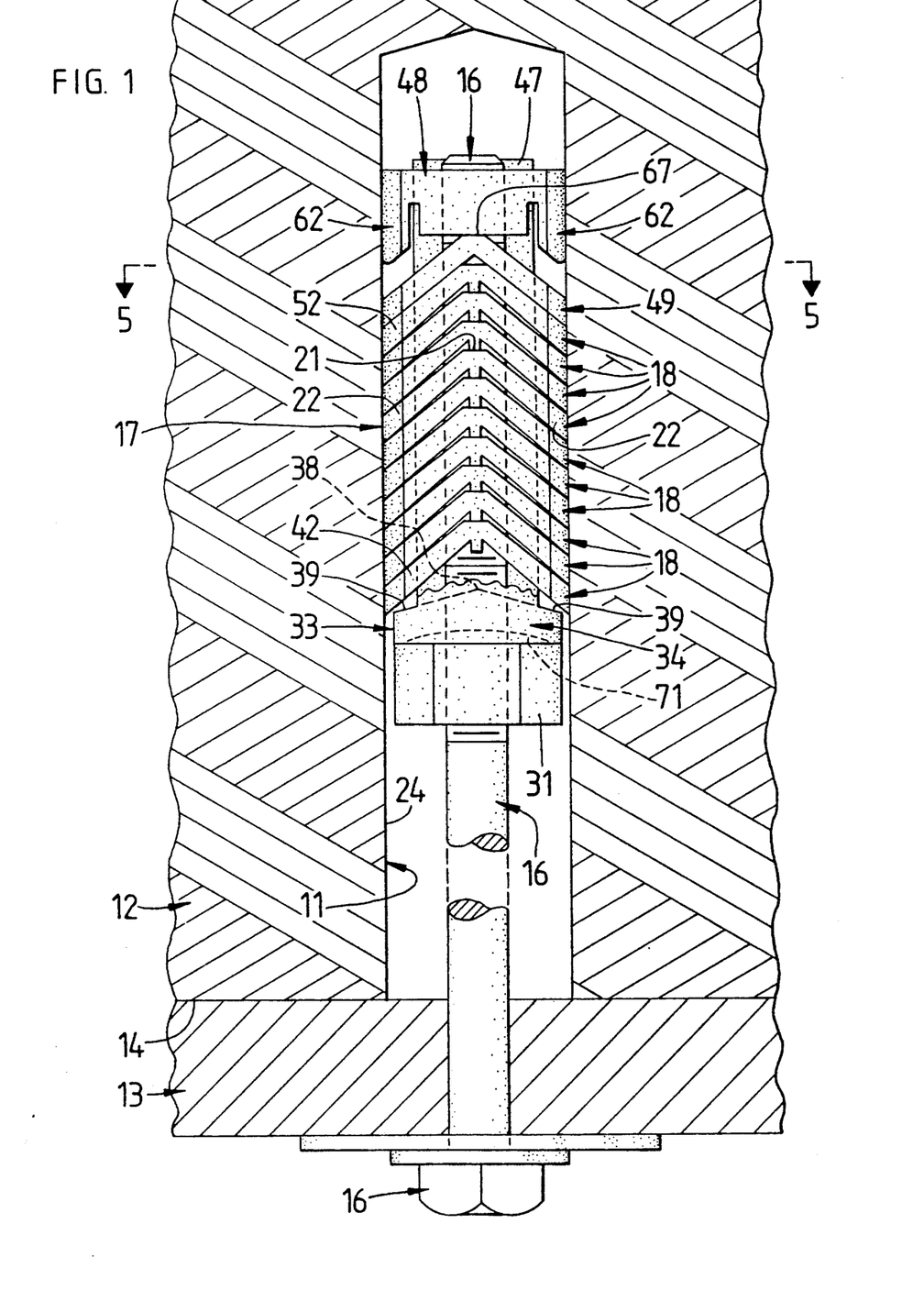
FIG. 1 is a sectional view showing my improved roof bolt anchor inserted into a predrilled hole.

As shown in FIG. 1, a preformed bore hole 11 is drilled within a rock strata 12. A ceiling support member 13 is supported subjacent and in abutment with a ceiling 14 defined by rock strata 12 by a roof bolt 16 extending through the ceiling support member 13 and within the hole 11. The roof bolt 16 is secured within the hole 11 by a roof bolt anchor 17 which is the subject of the present invention.

Figure 2:
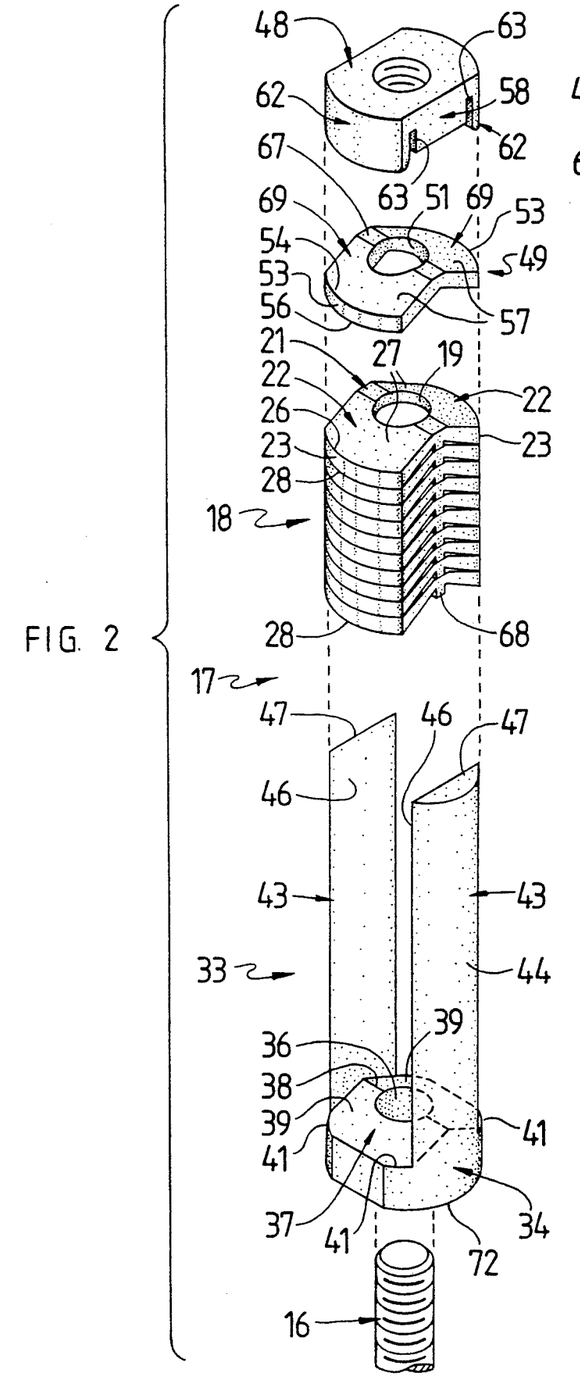
FIG. 2 is an exploded perspective view of the present invention.
Figure 3:
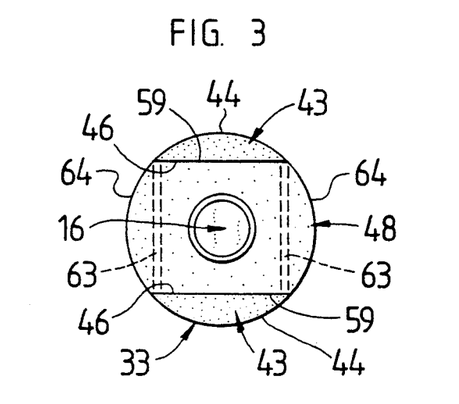
FIG. 3 is a top plan view of the present invention.
Figure 9:
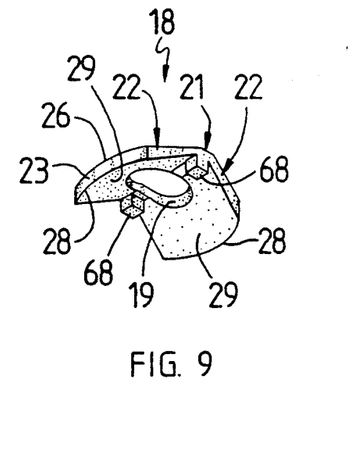
FIG. 9 is a bottom perspective view of a plastic leaf.

As shown in FIG. 2, the roof bolt anchor 17 includes a stacked plurality of elongated plastic leaves 18; each having an aperture 19 therethrough in which the roof bolt 16 is received. Each leaf 18 is bent transversely proximal to the aperture 19 to form a crest 21 and two inclined portions 22. As shown in FIGS. 2 and 9 each inclined portion 22 defines a curved outer face 23 that, when inserted within the hole 11, extends adjacent to a defining face 24 thereof. The outer face 23 has a curved upper edge 26 partially defined by an upper surface 27 of the leaf 18 and a curved lower edge 28 partially defined by a lower surface 29 of the leaf 18. The curved outer faces 23 extend adjacent to the defining face 24 when the anchor 17 is inserted within the hole 11 with each lower edge 28 resting on the upper edge of a next lowest leaf. The leaves 18 are supported by a support nut 31 which is threadably connected to bolt 16.

Figure 4:
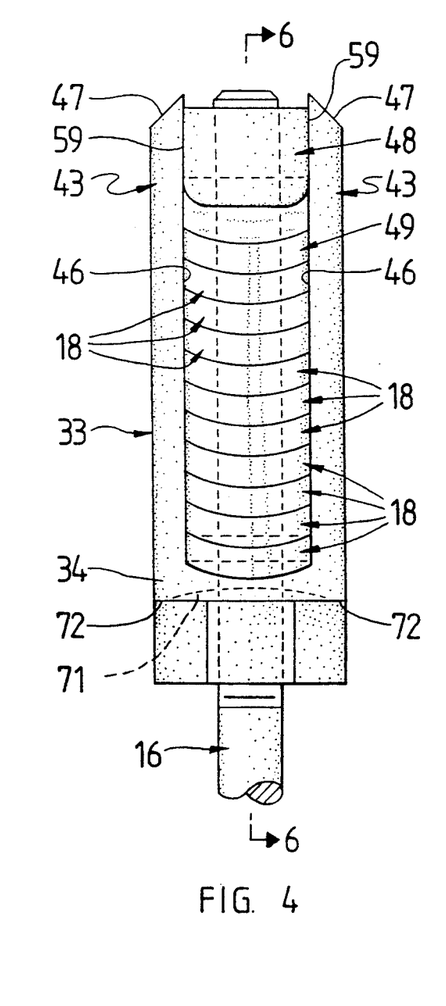
FIG. 4 is a side elevational view of the present invention.
Figure 5:
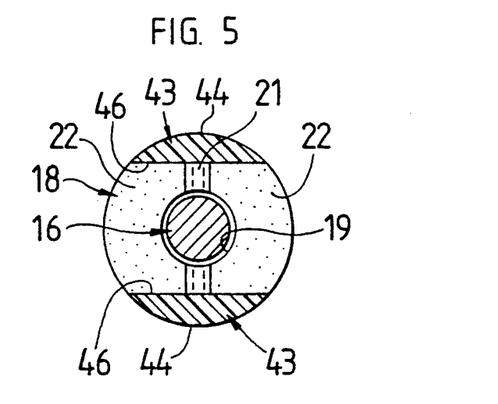
FIG. 5 is a sectional view taken along line 5—5 of FIG. 1.
Figure 6:
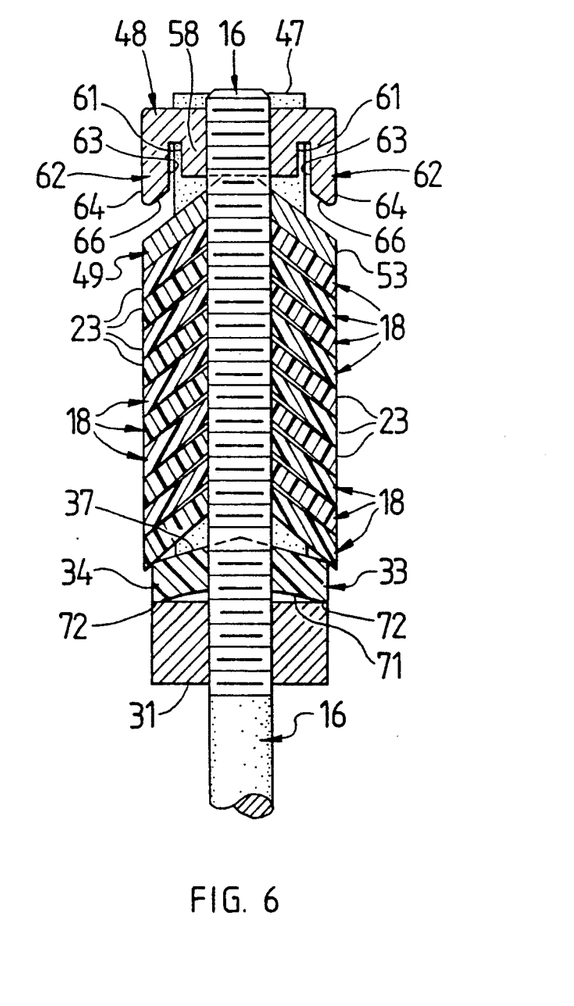
FIG. 6 is a sectional view taken along line 6—6 of FIG. 4.

A stirrup 33 is supported by the support nut 31 and includes a base 34 having an orifice 36 therethrough in which the bolt 16 is received. The base 34 defines an upper surface 37 that forms a ridge 38 proximal to the orifice 36. The upper surface 37 includes a pair of surfaces 39 that taper downwardly from the ridge 38 and define a curved pair of margins 41. As shown in FIG. 1, the inclination of the surfaces 39 is less than the inclination of the inclined portions 22 of leaves 18 such that a lower leaf 42 of the plurality of leaves 18 is supported exclusively on the margins 41 of the upper surfaces 37. As shown in FIGS. 2-6, the stirrup 33 further includes a pair of parallel vertical members 43 integrally connected to the base 34 on opposite sides thereof and at either end of ridge 38. The vertical members 43 extend upward from the base 34 and adjacent to the leaves 18 supported thereon to secure the leaves 18 in parallel relation to each other. Each vertical member 43 defines a cylindrical outer face 44 adjacent to the defining face 24 of hole 11 and a planar inner face 46 adjacent to leaves 18. An upper end 47 of each vertical member 43 is beveled as shown in FIGS. 2 and 4 to accommodate easier insertion of the anchor 17 within the hole 11.

When the anchor 17 is received within the hole 11, the outer faces 23 of leaves 18 and the outer faces 44 of vertical members 43 are snugly received within the hole 11 in contact with the defining face 24.

A compression nut 48 is threadably connected to the bolt 16 above the plurality of leaves 18 and intermediate the vertical members 43. The compression nut is held by the vertical members 43 in non-rotating relation thereto and accordingly moves vertically along bolt 16 responsive to the rotation thereof in a selected direction. A compression leaf 49 having an aperture 51 therethrough may be engaged on the bolt 16 therein and supported on an upper leaf 52 of the plurality of leaves 18. The compression leaf 49 is bent transversely to rest in planar contact with the upper leaf 52 and defines a curved outer face 53, upper and lower edges 54 and 56 and an upper surface 57 similar to the corresponding surfaces and edges 23 and 26-28 defined by the leaves 18.

In operation the bolt 16 and the anchor 17 are inserted within the hole 11 as is shown in FIG. 1. Once inserted, the bolt 16 is rotated in a selected direction to move the compression nut 48 vertically downward and in contact with the compression leaf 49. As shown in FIGS. 2, 3, 5 and 8, the compression nut 48 includes a rectangular body 58 threadably connected to bolt 16. The body 58 has a first pair of opposing sides 59 in adjacent parallel planar relation to the inner faces 46 and a second pair of opposing sides 61 extending perpendicularly thereto. A pair of L-shaped compression flanges 62 are integrally connected to the body 58 and project horizontally from the second sides 61 then vertically downward below the body 58 such that spaces 63 are defined between the sides 61 and flanges 62. The flange 62 further defines a beveled surface 66 partially defining an end thereof and tapering downwardly and laterally from the body 58.

Figure 7:
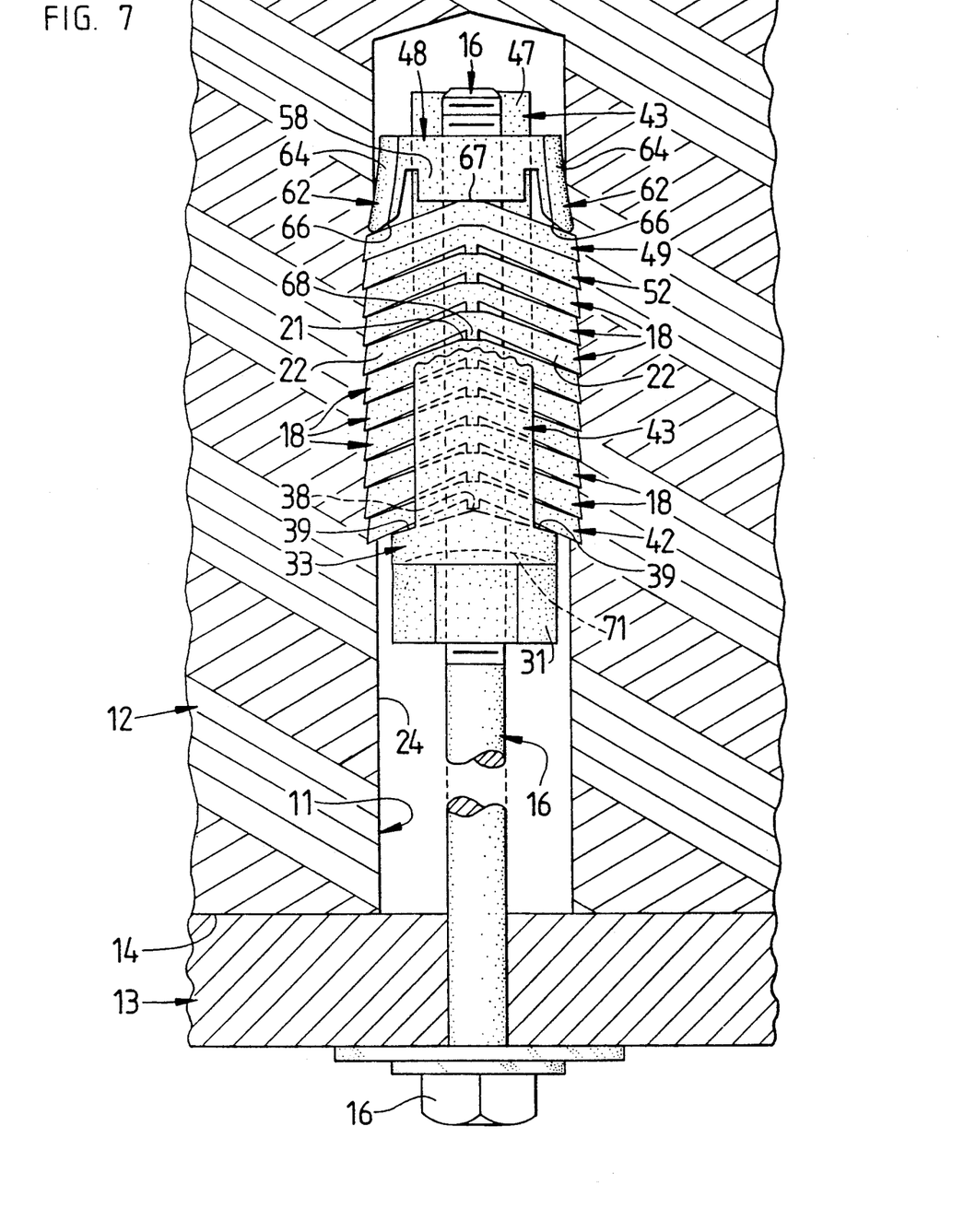
FIG. 7 is a sectional view corresponding to FIG. 1 showing the roof bolt anchor fully compressed.
Figure 8:
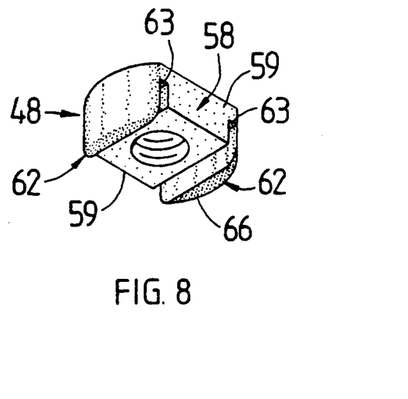
FIG. 8 is a bottom perspective view of the compression nut.

As the bolt 16 is rotated the stirrup 33 and leaves 18 remain stationary due to their abutment against defining face 24. The compression nut 48 will move downwardly and against the crest 67 of compression leaf 49. The downwardly moving compression nut will urge the compression leaf 49 and plurality of stacked plastic leaves 18 against the base 34 and thereby compress the leaves 49 and 18 into the flattened position shown in FIG. 7. As shown in FIGS. 1, 2 and 9, each plastic leaf 18 has a pair of spacers 68 integrally connected to the lower surface 24 thereof. The spacers 68 of each leaf 18 rest on the crest 21 of a next lowest leaf such that the downward compressive force exerted by the compression nut 48 on the compression leaf 49 is evenly distributed among leaves 18 to simultaneously urge the leaves 18 into the flattened position. As shown in FIG. 1, the inclined portions 22, prior to compression, are more inclined than the surfaces 39 of base 34. This configuration permits the crests 21 of leaves 18 to move a predetermined distance downward thus urging the outer faces 23 simultaneously outwardly an equal distance into the rock strata 12. If the rock strata 12 is softer than the plastic fingers 18 or exceptionally brittle, the fingers 18 will cut into the rock strata 12 and thereby grip the same to secure the bolt 16 within hole 11. If the rock strata is harder than the plastic leaves 18, the leaves 18 will be deformed and thus permeate the rock strata 12 to grip the same. During compression of leaves 18, it is essential that the inclined portions 22 remain downwardly inclined from crests 21 to outer faces 23. The ridge 38 is specifically provided to maintain the inclined portions 22 in such an inclined relation. When the lower leaf 42 is compressed in contact with upper surface 37, the spacers 68 of lower leaf 42 are supported on ridge 38 which limits further downward movement of crests 21. Actually, extreme compressive force exerted on the leaves 18 by the downward movement of the compressive nut 48 will crush the spacers 68 and even compress the thickness of each leaf 18; however, even under the extreme compression described, the crests 21 will be supported above any other portion of the downwardly inclined leaves 18. As shown in FIG. 1, when the body 58 of compression nut 48 first contacts crest 67, the compression flanges are spaced above the inclined portions 69 of compression leaf 49. As the compression nut 48 moves downwardly as shown in FIG. 7 and the compressive force exerted on leaves 18 begins to build, leaf 44 will consequently be urged toward a flattened position such that the beveled surfaces 66 of compressive flanges 62 will contact the upper surface 57 of the compressive leaf 49 and resist the further flattening of the leaves. As the compression nut 48 is urged downwardly, the flanges 62 bend and move laterally along the upper surface 57 of compression leaf 49 and into the rock strata 12. The compression leaf 49 is formed of hardened metal which provides the hardened upper surface 57 against which the flanges 62 are urged and along which the flanges move to contact strata 12. Further, the hardened metal compression leaf 49 will cut into strata 12 to secure the bolt 16 thereto. The flanges 62 are also formed of hardened metal and, when urged against the defining face 24, cut into the rock strata 12 to secure the bolt 16 thereto. As previously mentioned, the bolt 16 can be rotated such that the leaves 18 are compressed so tightly that the spacers 68 are crushed and the thickness of the leaves 18 is reduced. When the leaves are tightly compressed, they expand not only against the defining face 24 but also against the inner faces 46 of vertical members 43. The expansion of leaves 18 thereby urges the outer faces 44 of vertical members 43 against defining face 24 to further secure the bolt 16 within the hole 11. The stirrup 33 is formed from similar plastic as that used to form the leaves 18 and thus extreme compression of the vertical members 43 against a defining face of a hardened strata will deform the vertical member 43 and cause the vertical member 43 to permeate the strata 12.

Note from FIGS. 1 and 7, that the support nut 31 remains stationary in relation to bolt 16 by rotating concomitantly therewith. The nut 31 is not affected by the relative rotary movement of base 34 which is in contact with the nut 31. The base 34 has a convex lower surface 71 forming a rim 72 that rest on nut 31. Thus, the contacting surface area between base 34 and nut 31 is significantly less than the contact area between the nut 31 and bolt 16. This arrangement is preferred as a downwardly moving support nut would eliminate the compressive nature of the anchor, whereas an upwardly moving support nut would urge the outer faces 23 of leaves 18 upward and in opposition to the downward cutting motion for which the leaves 18 were designed. As shown in FIG. 7, when the leaves 18 are flattened and urged downwardly and outwardly from the bolt 16, the lower edges 28 are foremost in the path of movement and in effect form cutting edges which pierce the strata 12. Any upward movement of the leaves during expansion would not be conducive to the cutting movement so described. Eventually the compression nut 48 will move downwardly to a point where the compressive forces exerted thereby are enough to compress the convex lower surface 71 against the support nut 31. Such contact will secure the support nut 31 in non-rotating relation to base 34.

Figure 10:
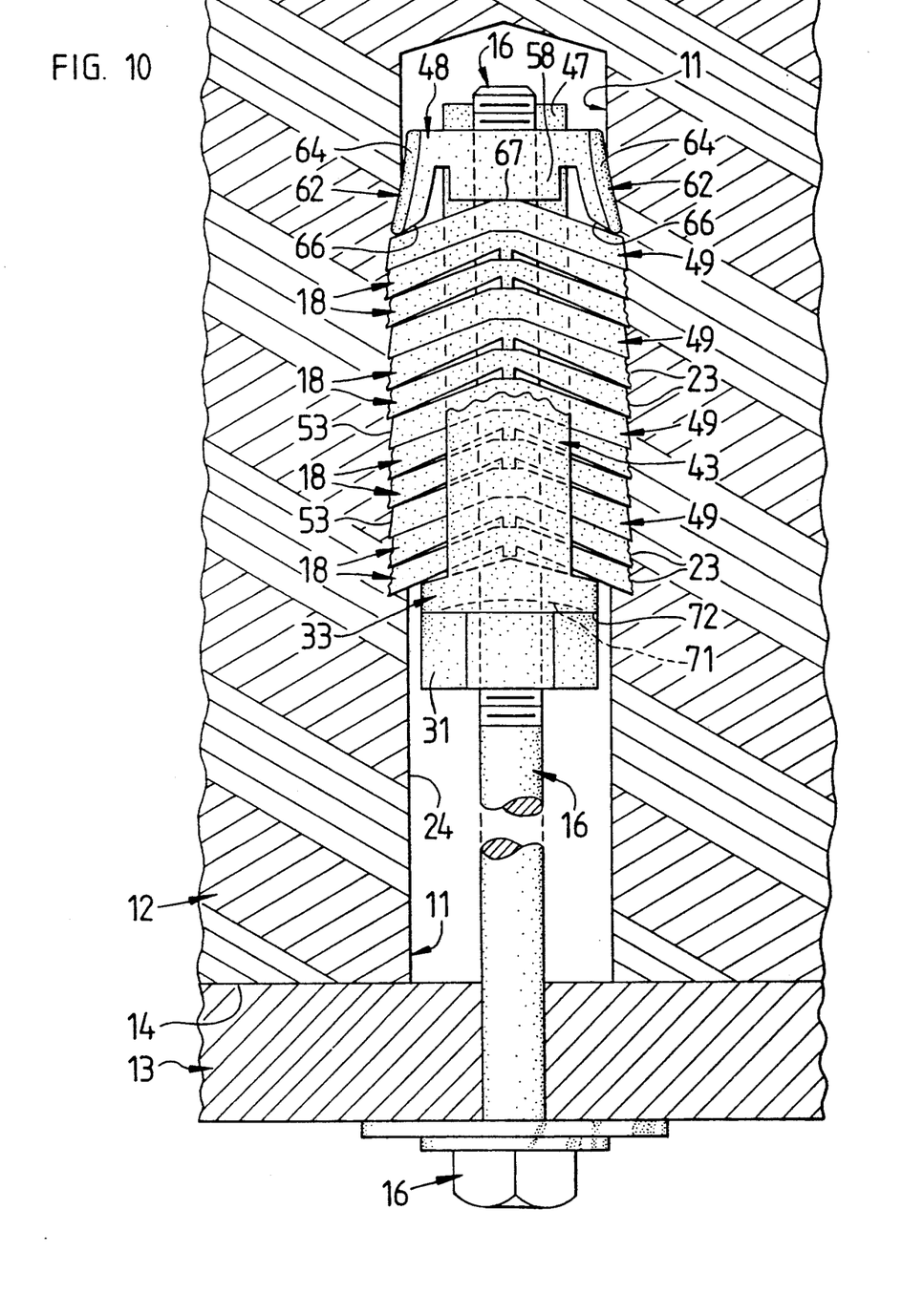
FIG. 10 is a sectional view of an alternate embodiment of the present invention.

An alternate embodiment to that previously described is shown in FIG. 10, wherein a plurality of compressive leaves 49 are intermixed in stacked parallel relation to the plastic leaves 18. When used to grip selected strata 12 the metal compression leaves 49 will pierce the strata 12 whereas the plastic leaves 18 deform and permeate the strata 12. This combination of compression leaves 49 and plastic leaves 18 provides a diversified gripping assembly that maximizes the ability of the anchor to grip a variety of different strata. From the foregoing, it should be clear that the present apparatus represents a substantial improvement over the prior art.

While I have shown my invention in two forms, it will be obvious to those skilled in the art that it is not so limited but is susceptible of various changes and modifications without departing from the spirit thereof.

What I claim is:

1. An improvement in roof bolt anchors for securing a mine roof bolt within a preformed hole, comprising:
   (a) a stacked plurality of leaves each defining an aperture therethrough through which said roof bolt is received and each being bent transversely to form a crest proximal to said aperture and defining a pair of outer edges on opposite sides of said crest;
   (b) support means mounted to said roof bolt subjacent said plurality of leaves for supporting said plurality of leaves in stacked, parallel relation thereon;
   (c) an expansion nut threadably connected to said roof bolt for vertical movement thereon responsive to the rotation thereof, wherein said expansion nut will move downwardly in non-rotating relation to said plurality of leaves, responsive to the rotation of said roof bolt, to urge said stacked plurality of leaves toward a flattened condition such that said edges are urged in pressed abutment with a defining face of said hole; and
   (d) a pair of expansion flanges integrally connected to said expansion nut and depending downwardly therefrom such that the downward movement of said compression nut will move said leaves toward a flattened condition and move said expansion flanges into contact with an upper leaf of said plurality of leaves proximal said opposite sides thereof to bias said outer edges downwardly as said leaves are compressed by said downwardly descending compression nut, wherein said expansion flanges are bendable and when urged against said upper leave move outwardly from said roof bolt and along said upper leaf to contact and grip said defining face of said hole.

2. An improvement in roof bolt anchors as defined in claim 1 wherein said expansion nut and said expansion flanges are more rigid and harder than said plurality of leaves.

3. An improvement in roof bolt anchors as defined in claim 1 wherein each of said pair of expansion flanges are substantially L-shaped and project horizontally from said expansion nut then vertically downward below said expansion nut such that a space is defined intermediate said expansion nut and said vertical portion.

4. An improvement in roof bolt anchors as defined in claim 1 wherein said pair of expansion flanges defines a pair of cylindrical outer surfaces diametrically spaced adjacent to said defining face of said hole.

5. An improvement in roof bolt anchors as defined in claim 1 wherein said supporting means comprises:
   (a) a support nut threadably connected to said roof bolt below said plurality of leaves; and
   (b) a stirrup, having a base supported by said support nut and slidably engaging said roof bolt within an orifice extending through said base, and a pair of elongated, parallel members integrally connected to said base and extending upwardly therefrom such that said leaves are supported by said base and held in parallel alignment by said upwardly extending members.

6. An improvement in roof bolt anchors as defined in claim 5 wherein said base defines an upper surface forming a ridge adjacent said orifice and a pair of opposing surfaces sloping downwardly from said ridge and intermediate said elongated members such that a lower leaf of said plurality of leaves straddles said ridge and is supported on said opposing sloping surfaces.

7. An improvement in roof bolt anchors as defined in claim 5 wherein each said elongated member defines a cylindrical outer surface adjacent to said defining face of said hole.

8. An improvement in roof bolt anchors as defined in claim 1 wherein selected ones of said plurality of leaves comprise spacers integrally connected thereto subjacent said crests thereof, wherein said spacer rest on a crest of a next lowest leaf of said plurality of leaves such that a downward force exerted on said upper leaf is exerted equally among the others of said plurality of leaves.

9. An improvement in roof bolt anchors as defined in claim 1 wherein selected ones of said plurality of leaves are more rigid and harder than selected others of said plurality of leaves such that compression of said selected ones against said defining face will cause said selected ones to pierce and thereby grip said defining face.

10. An improvement in roof bolt anchors as defined in claim 1 wherein selected ones of said plurality of leaves are plastic such that compression of said selected ones against said defining face will cause said selected ones to permeate and thereby grip said defining face.

11. An improvement in roof bolt anchors for securing a roof bolt within a hole preformed within a rock strata, said improvement comprising:
   (a) a plurality of stacked plastic leaves, each having an aperture therethrough in which said roof bolt is received and each being bent transversely to form a crest proximal said aperture and two inclined portions defining two edges on either side of said crest and adjacent a defining face of said hole; and
   (b) compression means threadably connected to said mine roof bolt for compressing said stacked plurality of plastic leaves to a flattened position such that said edges are urged laterally from said mine roof to engage said defining face and permeate said rock strata thereby gripping said strata and securing said mine roof bolt within said hole, wherein said compression means includes a support nut threadably connected to said roof bolt below said stacked plurality of plastic leaves; a stirrup loosely engaging said mine roof bolt and supported by said support nut for supporting said stacked plurality of plastic leaves, said stirrup having two vertical members extending alongside said plurality of leaves on opposite sides thereof and in snugly received abutment with said defining face such that said stirrup does not rotate responsive to the rotation of said mine roof bolt when received within said hole; and an expansion nut threadably connected to said mine roof bolt above said stacked plurality of plastic leaves and seated intermediate and in non-rotating relation to said vertical members, such that rotation of said mine roof bolt in a selected direction will urge said expansion nut downwardly to compress said stacked plurality of plastic leaves against said supporting stirrup and into said flattened position, wherein said expansion nut includes:
(i) a rectangular body threadably connected to said mine roof bolt and having a first pair of opposing sides in parallel planar relation to said vertical members and a second pair of opposing sides extending normal thereto; and
ii a pair of L-shaped compression flanges, each integrally connected to said body and projecting horizontally and then vertically downward from one of said second pair of sides and below said body, such that a space is defined between each of said second pair of sides and each said compression flange, wherein the downward movement of said expansion nut will move said expansion flanges in contact with a compression leaf supported on said stacked plurality of plastic leaves proximal to said edges thereof to bias said edges downwardly as said plurality of plastic leaves are compressed outwardly by said downwardly descending body.

12. An improvement in roof bolt anchors as defined in claim 11 wherein each said flange defines a cylindrical exterior surface adjacent to said defining face of said hole and a beveled surface diverging downwardly away from said mine roof bolt and partially defining a lower end of said flange such that said flange, when urged in contact with said compression leaf, moves outwardly thereon from said mine roof bolt and against said defining face, wherein said flange, being more rigid and harder than said plastic leaves, pierces said porous medium and thereby secures said mine roof bolt within said hole.

13. An improvement in roof bolt anchors as described in claim 11 wherein said compression leaf defines an aperture therethrough in which said roof bolt is received and is bent transversely proximal to said aperture such that said compression leaf is supported by said plurality of plastic leaves, wherein said compression leaf is more rigid than said plurality of plastic leaves and provides a hardened surface across which said compression flanges may move.

14. An improvement in roof bolt anchors for securing a roof bolt within a hole preformed within a rock strata, said improvement comprising:
(a) a plurality of stacked plastic leaves, each having an aperture therethrough in which said roof bolt is received and each being bent transversely to form a crest proximal said aperture and two inclined portions defining two edges on either side of said crest and adjacent a defining face of said hole; and
(b) compression means threadably connected to said mine roof bolt for compressing said stacked plurality of plastic leaves to a flattened position such that said edges are urged laterally from said mine roof to engage said defining face and permeate said rock strata thereby gripping said strata and securing said mine roof bolt within said hole, wherein said compression means includes a support nut threadably connected to said roof bolt below said stacked plurality of plastic leaves; a stirrup loosely engaging said mine roof bolt and supported by said support nut for supporting said stacked plurality of plastic leaves, said stirrup having two vertical members extending alongside said plurality of leaves on opposite sides thereof and in snugly received abutment with said defining face such that said stirrup does not rotate responsive to the rotation of said mine roof bolt when received within said hole; and an expansion nut threadably connected to said mine roof bolt above said stacked plurality of plastic leaves and seated intermediate and in non-rotating relation to said vertical members, such that rotation of said mine roof bolt in a selected direction will urge said expansion nut downwardly to compress said stacked plurality of plastic leaves against said supporting stirrup and into said flattened position, wherein said stirrup includes a base having an orifice therethrough in which said mine roof bolt is received and a ridge formed by an upper surface of said base that tapers downwardly to partially define a lateral margin thereof such that a lower leaf of said plurality of plastic leaves straddles said ridge and is supported by said margins and, when urged downwardly by the downward movement of said expansion nut, will contact said ridge and be supported thereby in such a manner that said inclined portions, though somewhat flattened, will remain inclined to support said bolt within said hole.

15. An improvement in roof bolt anchors for securing a mine roof bolt within a hole preformed within a rock strata, said improvement comprising:
(a) a stacked plurality of plastic leaves each having a central aperture therethrough in which said roof bolt is received and each being bent transversely proximal to said central aperture to form a pair of inclined portions connected at and forming a common crest and defining two opposing curved edges adjacent a defining face of said hole;
(b) support means connected to said bolt below said stacked plurality of leaves for supporting said plurality of leaves and maintaining a minimal inclination of said inclined portions;
(c) a compression nut threadably connected to said bolt for vertical movement thereon and having a pair of opposing L-shaped flanges integrally connected thereto and extending horizontally therefrom then vertically therebelow such that rotation of said bolt in a selected direction will urge said compression nut downwardly to compress said plurality of plastic leaves against said support means to reduce the inclination of said inclined portions and thereby urge said curved edges from said roof bolt and against said defining face of said hole.

16. An improvement in roof bolt anchors as defined in claim 15 wherein said support means comprises:
(a) a support nut threadably connected to said roof bolt below said plurality of plastic leaves; and
(b) a base portion supported by said support nut and having an orifice therethrough in which said roof bolt is slidably engaged, said base portion having a ridge formed on an upper surface thereof that tapers from said ridge and defines two curved margins of said base portion, wherein a lower leaf of said plurality of plastic leaves straddles said ridge and is supported by said curved margins and wherein downward movement of said plurality of plastic leaves resulting from the downward movement of said compression nut is obstructed when said lower leaf contacts said ridge such that said inclined portions are maintained at a minimal inclination approximately equal to the slope of said upper surface of said base.

17. An improvement in roof bolt anchors as described in claim 16 wherein said support means further comprises a pair of parallel vertical members integrally connected to said base at opposite ends of said ridge and extending upwardly from said base and adjacent said plurality of plastic leaves, wherein each said vertical member defines a planar inner face adjacent said plastic leaves and a cylindrical outer face adjacent said defining face of said bolt.

18. An improvement in roof bolt anchors as described in claim 17 wherein said vertical members are plastic and are snugly received within said hole in pressed engagement with said defining face and said plurality of plastic leaves such that the compressive forces exerted on said plurality of leaves by said downwardly moving compression nut will urge said leaves laterally against said vertical members and thereby urge said outer surfaces in pressed abutment with said defining face wherein said vertical members will partially deform and permeate said rock strata to secure said roof bolt within said hole.

19. An improvement in roof bolt anchors as described in claim 15 wherein said plurality of plastic leaves are substantially rigid and, when urged against said defining face, cut a plurality of grooves within said rock strata and thereby grip said rock strata to secure said bolt within said hole.

20. An improvement in roof bolt anchors as described in claim 15 wherein said plurality of plastic leaves are softer than said rock strata and, when urged thereagainst, deform and permeate said strata thereby gripping said strata to secure said roof bolt within said hole.

* * * * *